United States Patent
Wynn et al.

(10) Patent No.: US 10,360,043 B2
(45) Date of Patent: Jul. 23, 2019

(54) INSTALLATION OF DEVICE DRIVERS FROM VIRTUAL MEDIA

(71) Applicant: Dell Products, LP, Round Rock, TX (US)

(72) Inventors: Allen C. Wynn, Round Rock, TX (US); Chris E. Pepper, Leander, TX (US); Justin W. Johnson, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 295 days.

(21) Appl. No.: 14/803,817

(22) Filed: Jul. 20, 2015

(65) Prior Publication Data

US 2017/0024223 A1   Jan. 26, 2017

(51) Int. Cl.
*G06F 9/4401* (2018.01)
*G06F 9/50* (2006.01)
*G06F 8/61* (2018.01)

(52) U.S. Cl.
CPC .......... *G06F 9/4411* (2013.01); *G06F 9/4406* (2013.01); *G06F 9/5077* (2013.01); *G06F 8/61* (2013.01)

(58) Field of Classification Search
CPC .................................................. G06F 9/4411
See application file for complete search history.

(56) References Cited

U.S. PATENT DOCUMENTS

| | | | |
|---|---|---|---|
| 6,105,142 A * | 8/2000 | Goff | G06F 9/46 713/320 |
| 8,010,630 B2 | 8/2011 | Barreto et al. | |
| 2005/0193118 A1 | 9/2005 | Le et al. | |
| 2006/0026339 A1* | 2/2006 | Rostampour | G06F 3/0605 711/103 |
| 2009/0150909 A1 | 6/2009 | Barreto et al. | |

OTHER PUBLICATIONS

Hyde; "The Art of Assembly Language Programming"; Sep. 29, 1996; No Starch Press; Chapter 17. http://www.oopweb.com/Assembly/Documents/ArtOfAssembly/Volume/Chapter_17/CH17-1.html.*

"Intel® Active Management Technology—Increase Efficiency and Effectiveness, Automatically," Intel Corporation 2015, 8 pgs. http://www.intel.com/content/www/us/en/architecture-and-technology/intel-active-management-technology.html.

"Wyse WSM Desktop and Application Virtualization," High-performance desktop and app virtualization solution with server provisioning, Dell, Inc., 2015, 8 pgs. http://www.dell.com/us/business/p/wyse-wsm/pd?~ck=anav.

* cited by examiner

*Primary Examiner* — Kim Huynh
*Assistant Examiner* — Eric Chang
(74) *Attorney, Agent, or Firm* — Larson Newman, LLP (57) ABSTRACT

Device drivers are provided from virtual media. System resources trap input/output data associated with the device drivers. Memory is allocated for the virtual media and populated with the device drivers using the input/output data. As an operating system installs, the virtual media is readable and is accessed for the device drivers.

20 Claims, 13 Drawing Sheets

INSTALLATION OF DEVICE DRIVERS FROM VIRTUAL MEDIA

FIELD OF THE DISCLOSURE

The present disclosure generally relates to information handling systems, and more particularly relates to virtual installation of device drivers.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
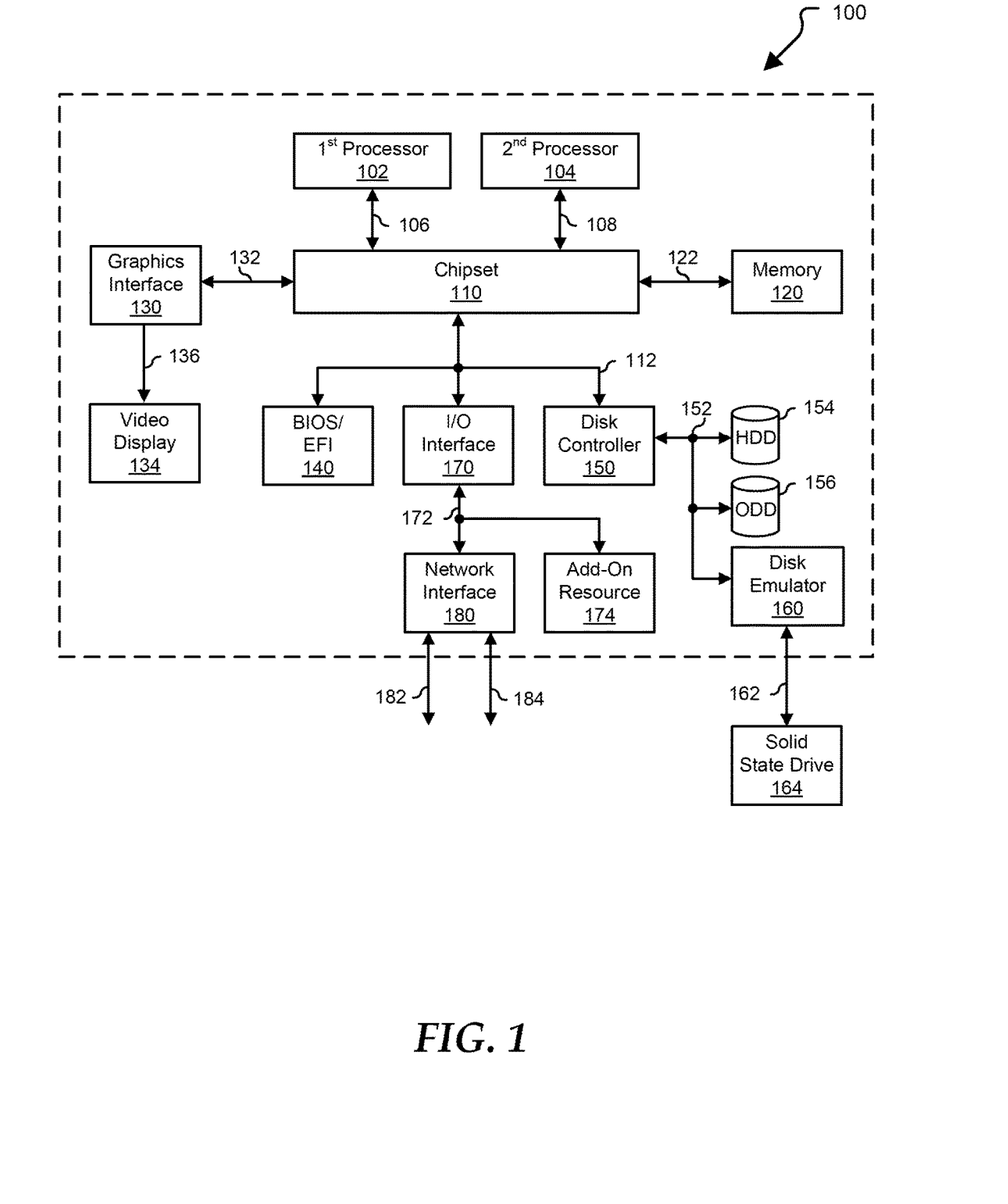
FIG. 1 is a block diagram illustrating an information handling system according to an embodiment of the present disclosure.

FIG. 1 illustrates a generalized embodiment of information handling system 100, according to exemplary embodiments. For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 can include devices or modules that embody one or more of the devices or modules described above, and operates to perform one or more of the methods described above. Information handling system 100 includes a processors 102 and 104, a chipset 110, a memory 120, a graphics interface 130, include a basic input and output system/extensible firmware interface (BIOS/EFI) module 140, a disk controller 150, a disk emulator 160, an input/output (I/O) interface 170, and a network interface 180. Processor 102 is connected to chipset 110 via processor interface 106, and processor 104 is connected to chipset 110 via processor interface 108. Memory 120 is connected to chipset 110 via a memory bus 122. Graphics interface 130 is connected to chipset 110 via a graphics interface 132, and provides a video display output 136 to a video display 134.

In a particular embodiment, information handling system 100 includes separate memories that are dedicated to each of processors 102 and 104 via separate memory interfaces. An example of memory 120 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 140, disk controller 150, and I/O interface 170 are connected to chipset 110 via an I/O channel 112. An example of I/O channel 112 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 110 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 140 includes BIOS/EFI code operable to detect resources within information handling system 100, to provide drivers for the resources, initialize the resources, and access the resources.

Disk controller 150 includes a disk interface 152 that connects the disc controller 150 to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits a solid-state drive 164 to be connected to information handling system 100 via an external interface 162. An example of external interface 162 includes a USB interface, an IEEE 1194 (Firewire) interface, a proprietary interface, or a combination thereof. Alternatively, solid-state drive 164 can be disposed within information handling system 100.

I/O interface 170 includes a peripheral interface 172 that connects the I/O interface to an add-on resource 174 and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a NIC disposed within information handling system 100, on a main circuit board of the information handling system, integrated onto another component such as chipset 110, in another suitable location, or a combination thereof. Network interface device 180 includes network channels 182 and 184 that provide interfaces to devices that are external to information handling system 100. In a particular embodiment, network channels 182 and 184 are of a different type than peripheral channel 172 and network interface 180 translates information from a format suitable to the peripheral channel to a format suitable to external devices. An example of network channels 182 and 184 includes InfiniBand channels, Fibre Channel channels, Gigabit Ethernet channels, proprietary channel architectures, or a combination thereof. Network channels 182 and 184 can be connected to external network resources (not illustrated). The network resource can include another information handling system, a data storage system, another network, a grid management system, another suitable resource, or a combination thereof.

Figure 2:
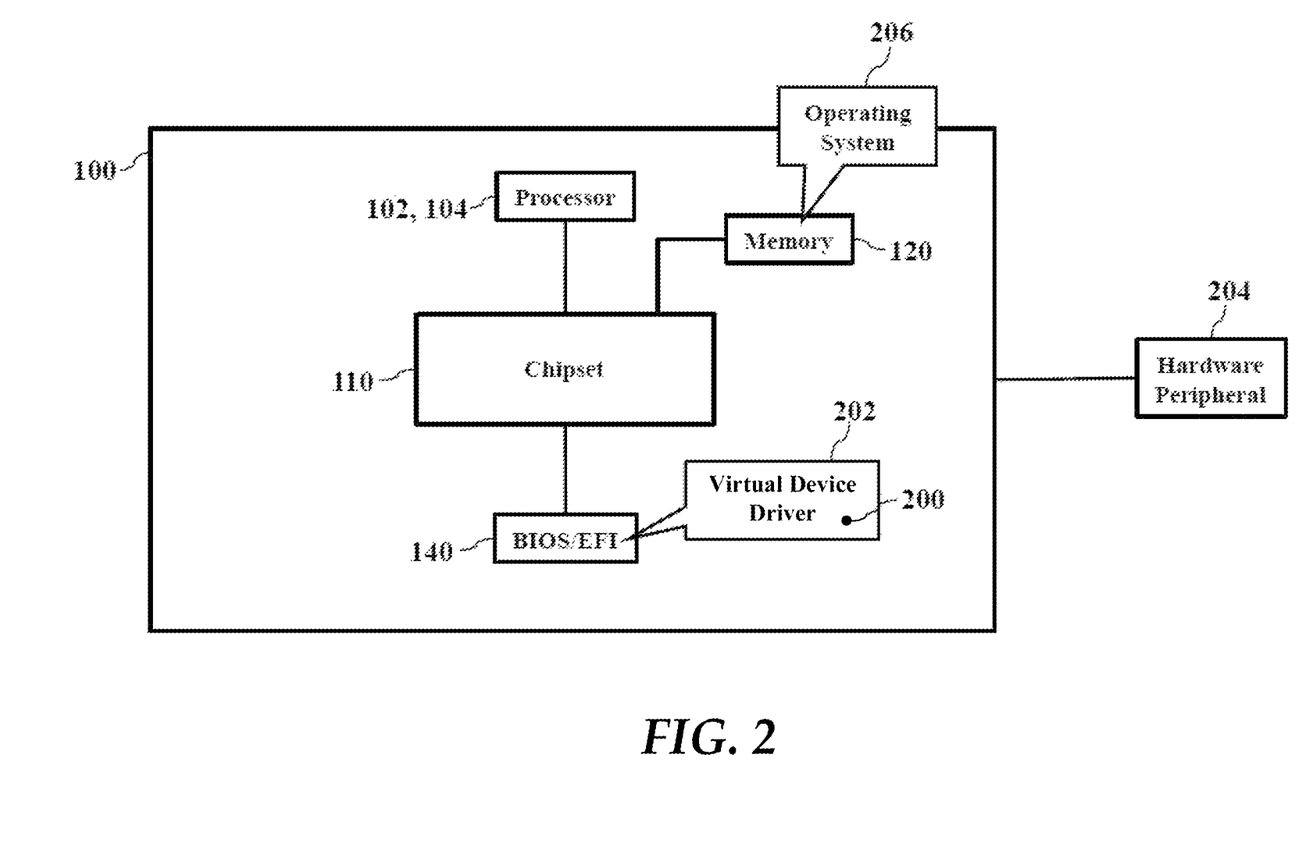
FIG. 2 further illustrates the information handling system, according to exemplary embodiments.

FIG. 2 further illustrates the information handling system 100, according to exemplary embodiments. Here the information handling system ("IHS") 100 accesses a device driver 200 from a virtual device 202. The virtual device 202 is enabled from the basic input and output system/extensible firmware interface (BIOS/EFI) module 140. That is, exemplary embodiments emulate the virtual device 202 from the BIOS/EFI module 140, which appears to store the device driver 200. As the reader may understand, conventional device drivers are obtained from removable media (such as floppy disk or USB drive) or from an Internet download using a communications network. The device driver 200 is a software component that provides an interface to a hardware peripheral 204. Device drivers are usually required for modems, keyboards, network adapters, printers, and many other components. The device driver 200 specifies application programming interfaces, calls, and/or functions for operating or communicating with the hardware peripheral 204. The device driver 200 may thus specify device-specific code for executing commands and actions by the hardware peripheral 204. When the IHS 100 powers up or on and boots, the IHS 100 executes an operating system 206. The operating system 206 issues control commands or calls, and the device driver 200 performs a translation and generates device-specific calls or commands. So, when the virtual device 202 is enabled, the virtual device 202 appears to contain the device driver 200, perhaps regardless of an actual, physical storage location.

Figure 3:
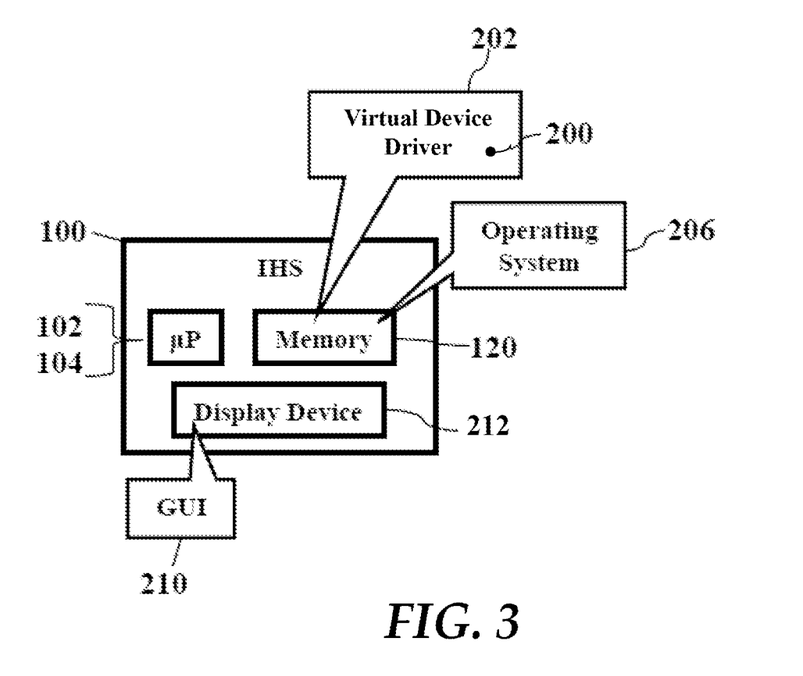
FIGS. 3-4 illustrate a graphical user interface, according to exemplary embodiments.
Figure 4:
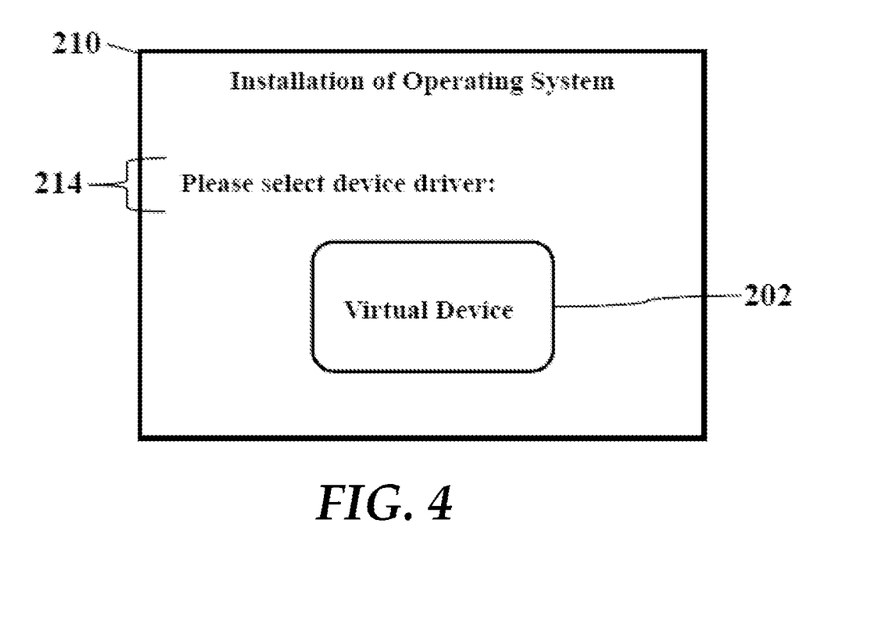

FIGS. 3-4 illustrate a graphical user interface 210, according to exemplary embodiments. As the operating system 206 installs, the operating system 206 may require access to the device driver 200. The processor ("μP") 102 and/or 104 may pause execution of the installation and prompt for the device driver 200. FIG. 3 thus illustrates the processors 102 and/or 104 generating the graphical user interface (or "GUI") 210 for display on a display device 212. FIG. 3 illustrates display device 212 integrated within the information handling system ("IHS") 100 (such as mobile tablet or smartphone). However, the display device 212 may be a separate component, such as a monitor. When the operating system 206 requires access to the device driver 200, FIG. 4 illustrates a graphical prompt 214. A user of the IHS 100 is thus prompted to select a physical location of the device driver 200 in order for installation to continue.

FIG. 4 thus graphically illustrates the virtual device 202. Exemplary embodiments emulate the virtual device 202 as an actual, physical hardware storage device from which the device driver 200 may be retrieved. So, when the operating system 206 requires access to the device driver 200, the user need only tactilely select the graphical icon associated with the virtual device 202. The virtual device 202 only logically contains the device driver 200. The actual, physical storage location for the device driver 200 may be elsewhere, as later paragraphs will explain. Regardless, during an installation of the operating system 206, the user may direct the operating system 206 to the virtual device 202 for the device driver 200. Installation may thus continue without a physical presence for the device driver 200.

The virtual device 202 is thus visible to the operating system 206. Exemplary embodiments may present the virtual device 202 using the ATA Packet Interface (or "ATAPI") protocol, which is commonly used for parallel and serial disk storage devices. The virtual device 202 may thus emulate and respond to Small Computer System Interface (or "SCSI") packetized commands. Logically and operationally, then, the virtual device 202 emulates a physical storage disk drive.

Figure 5:
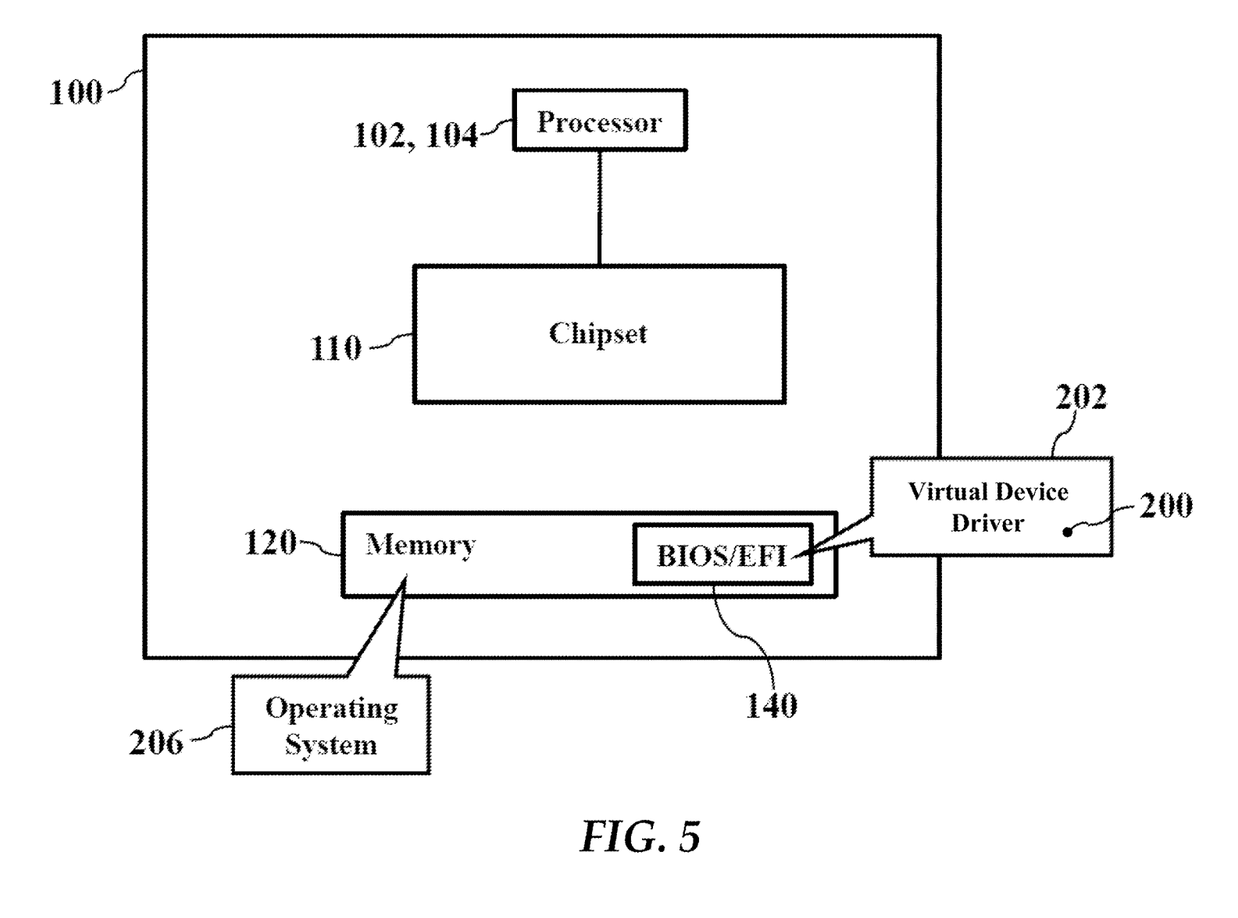
FIGS. 5-6 illustrate availability of a device driver, according to exemplary embodiments.
Figure 6:
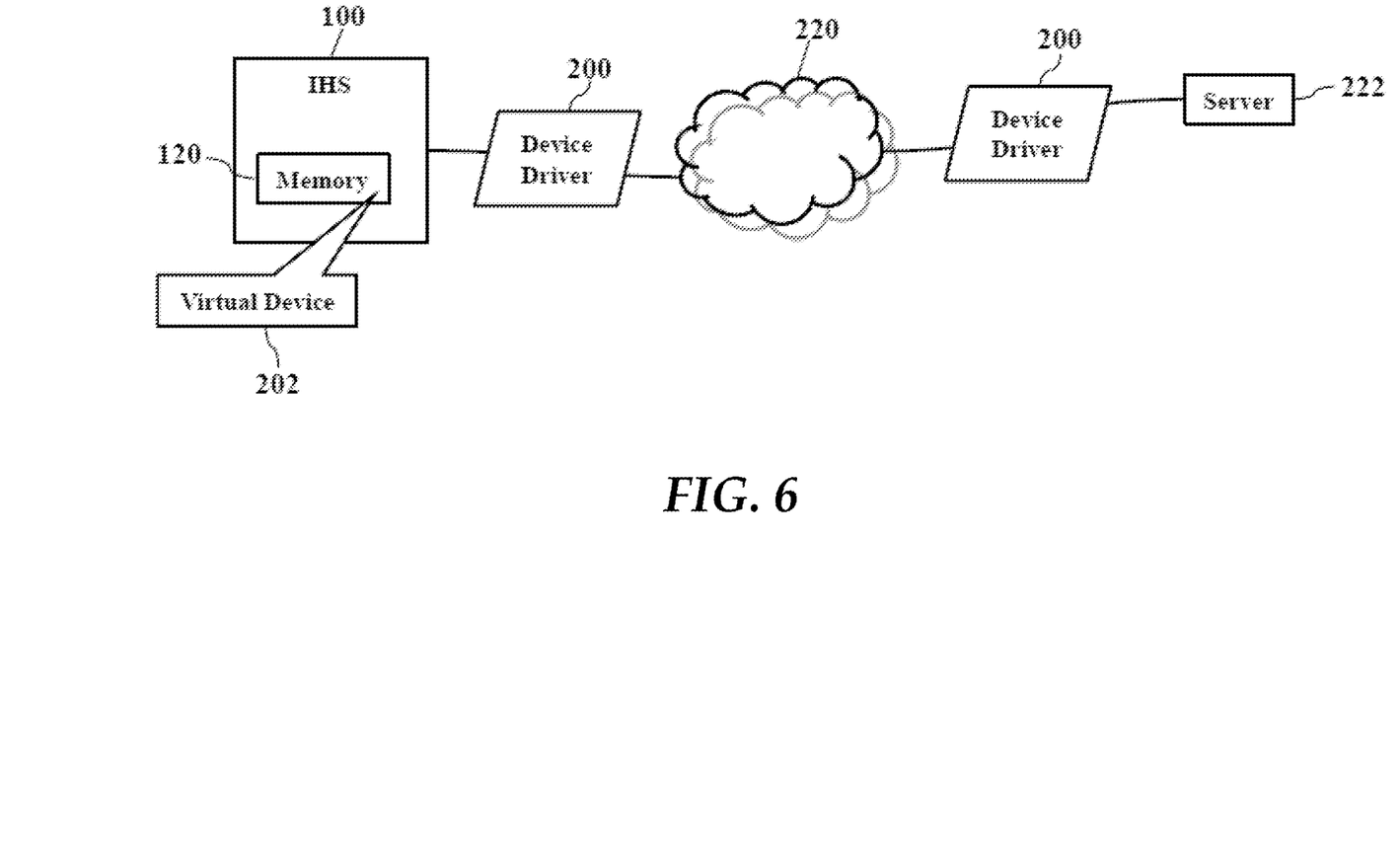

FIGS. 5-6 illustrate availability of the device driver 200, according to exemplary embodiments. Even though the device driver 200 appears available from the virtual device 202, the device driver 200 may be physically stored at any location. FIG. 5, for example, illustrates the device driver 200 retrievable from the basic input and output system/extensible firmware interface (BIOS/EFI) module 140. That is, the device driver 200 may be locally stored in the hardware memory 120 dedicated to the BIOS/EFI module 140, such as in a dedicated memory partition. As another example, the device driver 200 may be stored or available from nonvolatile memory 120 (such as read-only memory and/or flash memory). The device driver 200 may alternatively or additionally be stored in, or associated with, an existing firmware volume or a new volume dedicated to device drivers. However, the device driver 200 may also be stored in a non-BIOS region of the nonvolatile memory 120, such as a Platform Data Region (or "PDR") of read-only memory and/or flash memory.

FIG. 6 illustrates remote retrieval. Here the device driver 200 may be retrieved via a communications network 220 (using the network interface 180 illustrated in FIG. 1). The device driver 200, for example, may be stored at a network address associated with a remote server 222. The IHS 100 may thus send a query to the remote server 222 (or any other networked device) and retrieve the device driver 200 as a query response. The IHS 100 may then locally store the device driver 200 in any local memory location.

Factors may determine the physical storage location. For example, some local physical storage locations may be better suited to software updates, which may prefer one local storage location to another. Some memory locations may have space constraints and/or have easier retrieval and presentation. Some storage locations may not persist if a hard disk drive is replaced or erased. Moreover, some storage locations may require network access. Thee are just some considerations that may determine a desirable physical storage location for the device driver 200.

Figure 7:
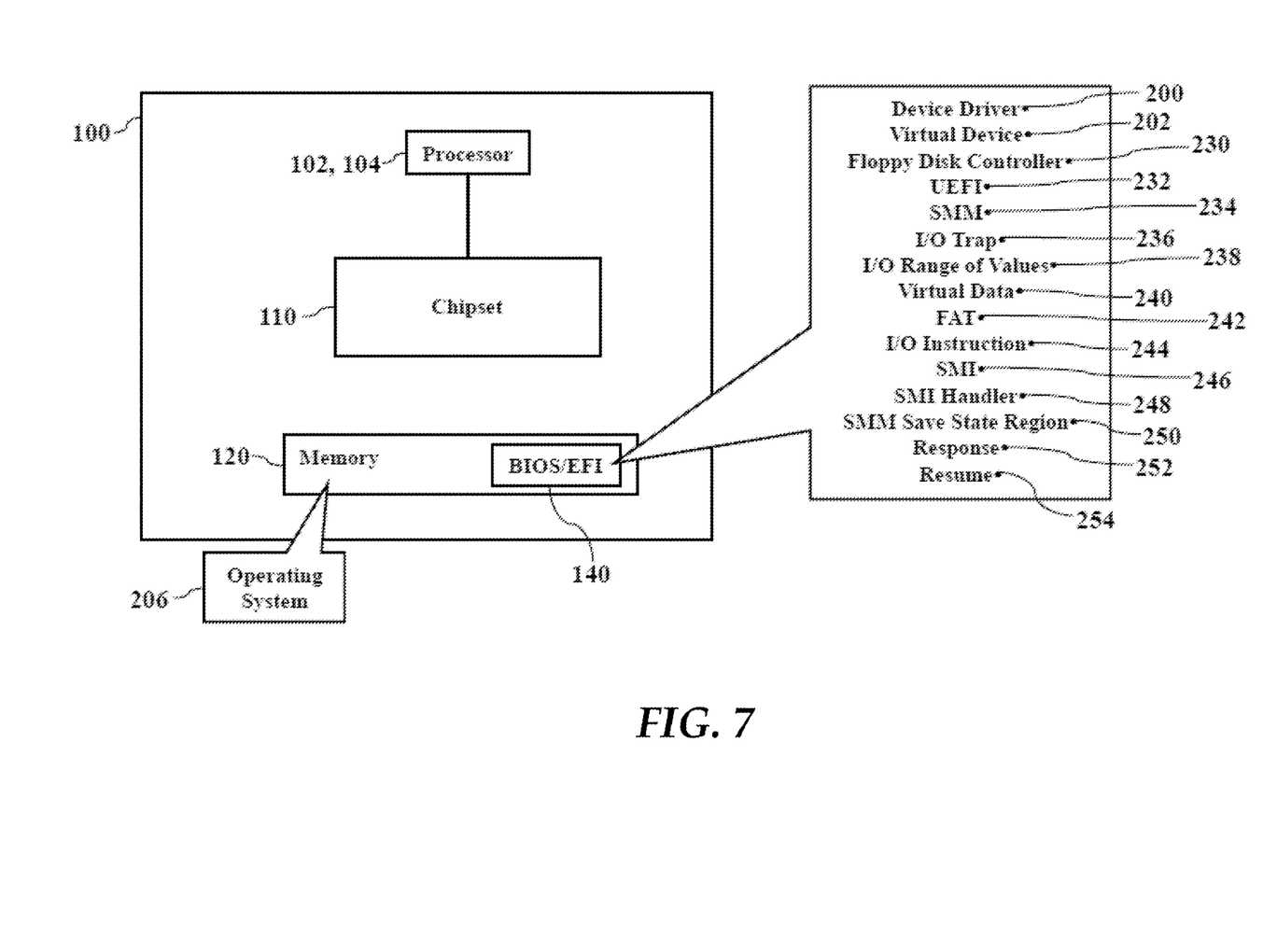
FIG. 7 illustrates controller emulation, according to exemplary embodiments.

FIG. 7 illustrates controller emulation, according to exemplary embodiments. Regardless of where the device driver 200 is locally stored, exemplary embodiments may emulate the virtual device 202. FIG. 7, for example, illustrates emulation of a floppy disk controller 230, which is known as a hardware I/O chip communicating via a bus. Here the BIOS/EFI module 140 was experimentally written as a Unified Extensible Firmware Interface (or "UEFI") 232 for the System Management Mode (or "SMM") 234 of operation. UEFI is a standard firmware interface that may replace the BIOS booting process. The BIOS/EFI module 140 was written to use one or more I/O traps 236 that specify an I/O range 238 of values, thus emulating the floppy disk controller 230. The virtual device 202 thus contains virtual data 240, which is physically a file allocation table (or "FAT") 242 file system that contains or specifies the device driver 200. Even though experimental testing emulated the floppy disk controller 230, exemplary embodiments may be implemented to emulate a programmed input/output (or "PIO") device that transfers data from any peripheral device.

Exemplary embodiments thus provide virtual media. The SMM I/O traps 236 define the virtual device 202 for the device driver 200 during installation of the operating system 206. Exemplary embodiments may thus provide a solution that may only use the BIOS module 140 with existing processor calls. No service processor, specialized circuitry, or external software is required. When the operating system 206 performs an input/output to the virtual device 202, there is no I/O transaction with any external bus. Exemplary embodiments, instead, only utilize internal processor operations and actions. When the processor executes an I/O instruction 244, a System Management Interrupt (or "SMI") 246 is generated and the BIOS SMI handler 248 is called. The BIOS SMI handler 248 extracts and services the virtual data from the SMM Save State Region 250 to generate a response 252. The response 252 is stored to, or associated with, the SMM Save State region 250 and performs a resume 254 from the SMM 234. Installation execution thus resumes at the next instruction immediately after the I/O instruction 244 that caused the SMI 246. No hardware is added, and exemplary embodiments execute purely from BIOS module 140. The BIOS module 140 thus provides the virtual device 202 without additional hardware and software support beyond the processor 102 and/or 104 and the chipset 110.

Figure 8:
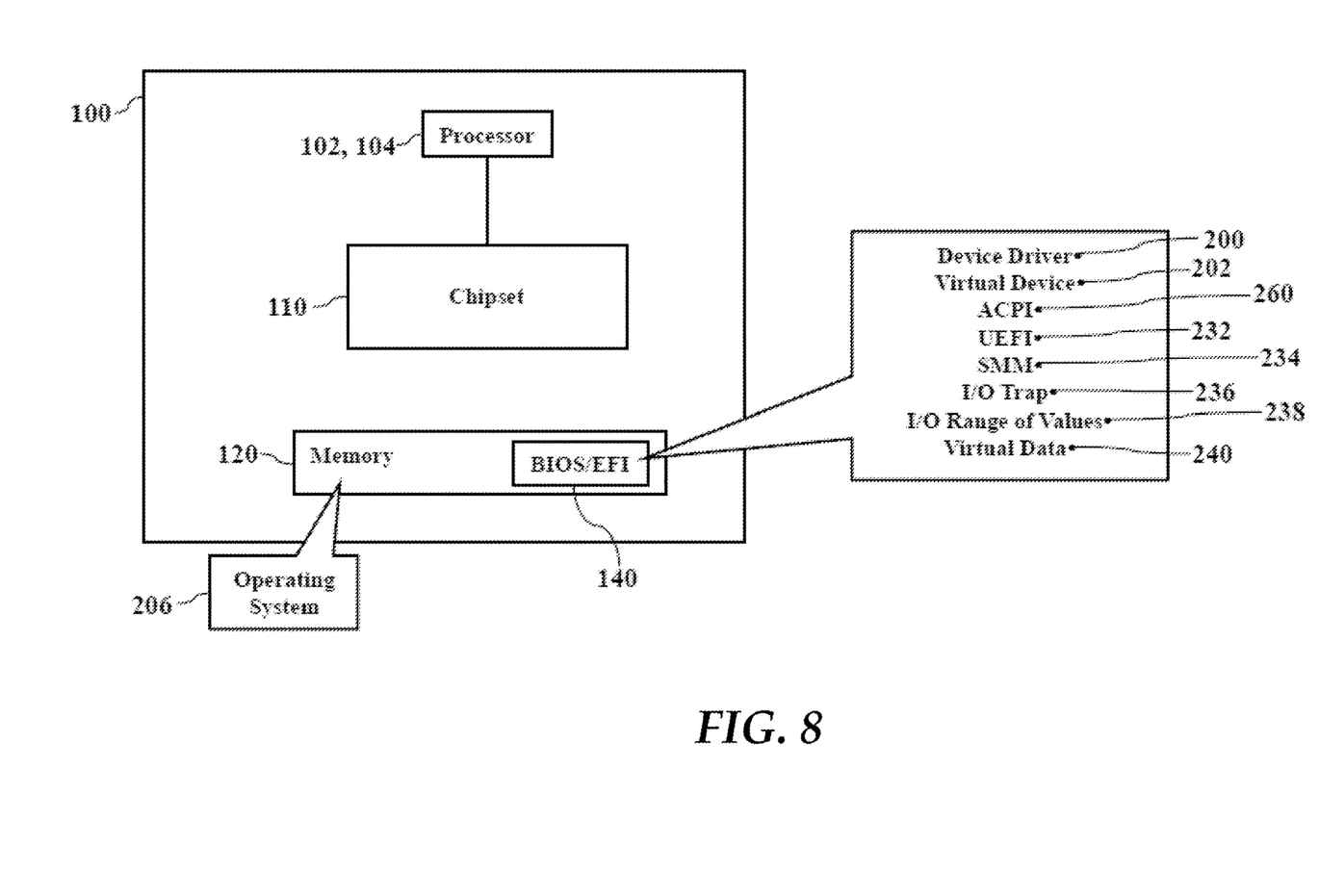
FIG. 8 illustrates presentation of a virtual device, according to exemplary embodiments.

FIG. 8 illustrates presentation of the virtual device 202, according to exemplary embodiments. The operating system 206 must learn or know of the logical and/or operational existence of the virtual device 202. If the operating system 206 cannot "see" or recognize the virtual device 202, the operating system 206 may conventionally delay or fail an installation boot-up process. Experimental testing thus described the virtual device 202 using the Advanced Configuration and Power Interface (or "ACPI") specification 260 for consumption of electrical power. The ACPI specification 260 was thus used to define input/output resources (e.g., the I/O range 238 of values and/or the virtual data 240) that the BIOS/EFI module 140 trapped using the I/O traps 236.

Figure 9:
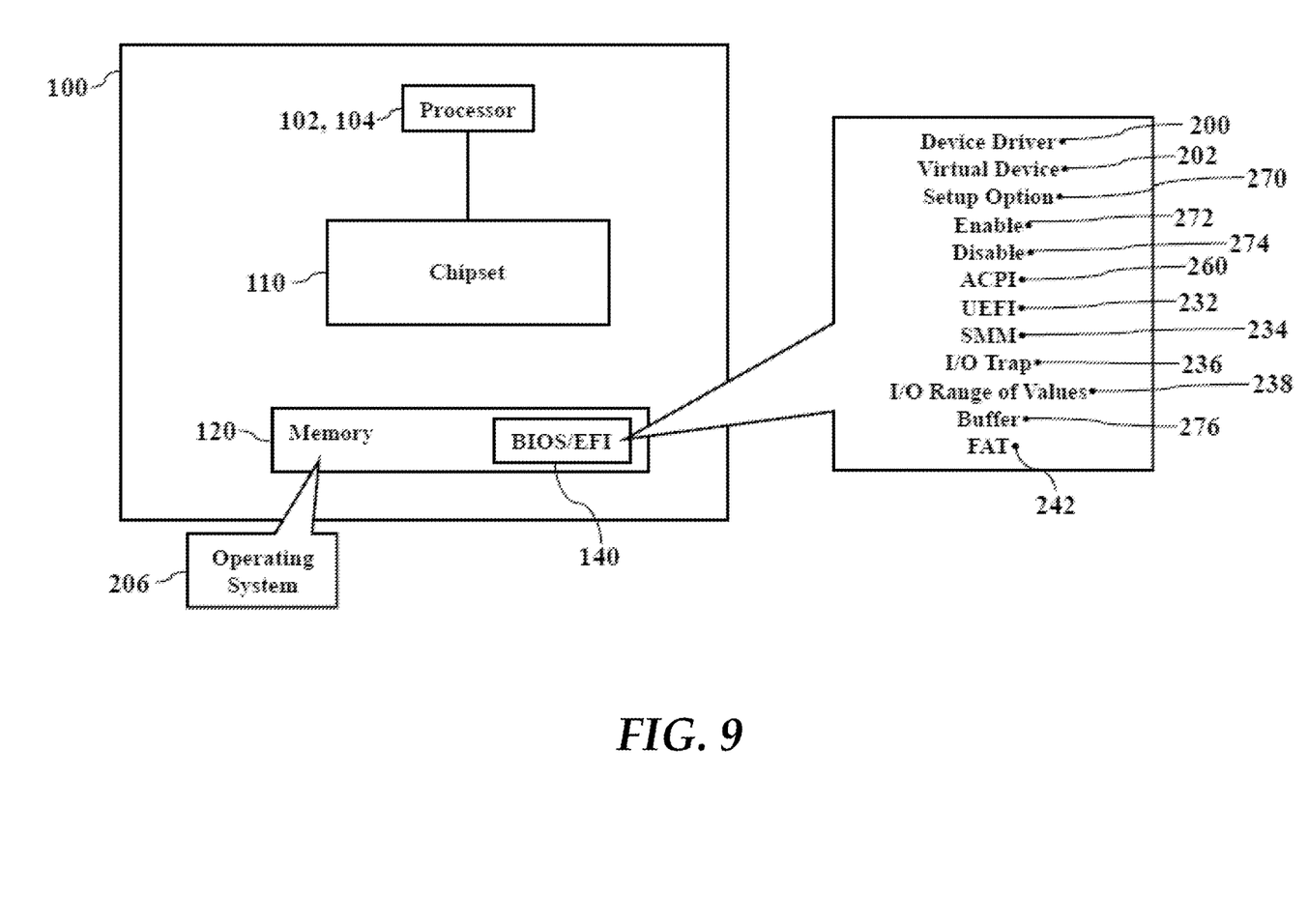
FIG. 9 illustrates enablement and disablement of the virtual device, according to exemplary embodiments.

FIG. 9 illustrates enablement and disablement of the virtual device 202, according to exemplary embodiments. The virtual device 202 may be configured to always be present and available. However, exemplary embodiments may include a setup option 270 that permits a user to enable 272 or disable 274 the virtual device 202. For example, after the BIOS SMM virtual device 202 is used or read, the user may then disable the SMM-based virtual device 202 through a BIOS set-up controls. For example, when the virtual device 202 is disabled, the device driver 200 may not install, as the Advanced Configuration and Power Interface (or "ACPI") specification 260 indicates the virtual device 202 is not present. When the virtual device 202 is enabled, the device driver 200 may install, as the Advanced Configuration and Power Interface (or "ACPI") specification 260 indicates the virtual device 202 is present. Another enablement option, though, may install the device driver 200 when a removable media device is determined for an installation boot. Another enablement option may install the device driver 200 during a Preboot Execution Environment (or "PXE"). Still another enablement option may install the device driver 200 during a hotkey operation. Regardless, exemplary embodiments permit the user to enable 272 or disable 274 the virtual device 202.

The virtual device 202 was enabled during experimental testing. The BIOS/EFI module 140 hooked the appropriate I/O range 238 of values. A buffer 276 in the memory 120 was allocated for the virtual device 202. The device driver 200 was retrieved and the buffer 276 was populated in the FAT format 242. Optionally, exemplary embodiments may delay retrieval and storage until after the virtual device 202 is read, after which the buffer 276 may be allocated. Regardless, when the operating system 206 boots, the operating system 206 sees the virtual device 202 is present. As the operating system 206 installs and needs the device driver 200, the user may direct the operating system 206 to the virtual device 202 (perhaps using the graphical user interface 210 illustrated in FIGS. 3-4). The installation may thus continue or proceed via local retrieval of the device driver 200.

Exemplary embodiments are application to multiple operating systems. As the reader may understand, some computing devices may store two (2) or more different operating systems. Indeed, there are many competing operating systems available with unique features and aspects. Many users may thus maintain multiple different operating systems for different situations and/or applications. As such, exemplary embodiments may identify which one of the multiple operating systems is booting/installing. The virtual device 202 may then present the device driver(s) xx that are specific to the installing operating system 206.

Figure 10:
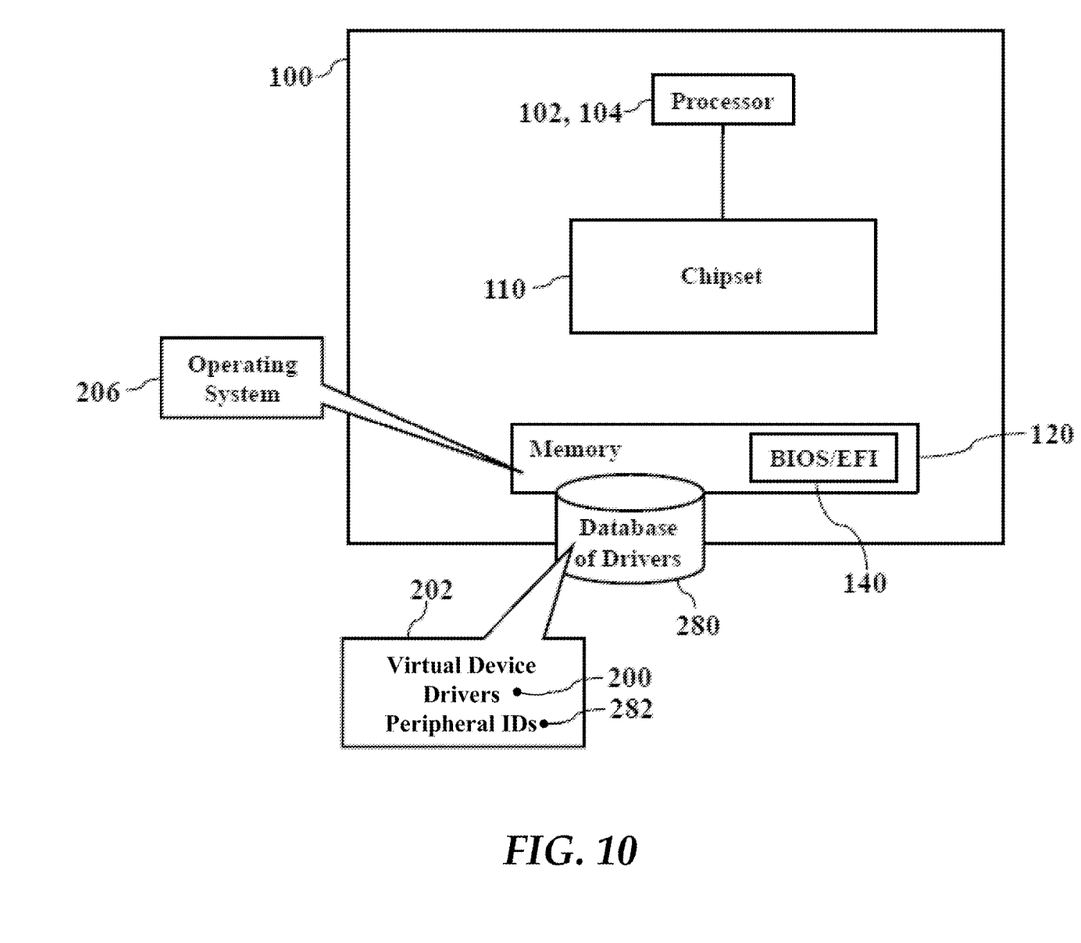
FIG. 10 illustrates a database of drivers, according to exemplary embodiments.

FIG. 10 illustrates a database 280 of drivers, according to exemplary embodiments. The reader likely realizes that many device drivers 200 may be required for different hardware peripherals. Any one of the different device drivers 200 may thus be required during installation and/or use of a different hardware peripheral. The database 280 of drivers may thus have electronic database associations that map, relate, or associate the different device drivers 200 to different identifiers 282 of peripheral devices. Each peripheral device may have a serial number, model number, or other unique alphanumeric identifier. The different device drivers 200 may thus be logically associated with the database 280 of drivers and with the virtual device 202, even though the physical storage location may differ (as earlier explained with reference to FIGS. 5-6). As any device driver 200 is needed, the user may thus direct the operating system 206 to the virtual device 202, regardless of the physical storage location.

Figure 11:
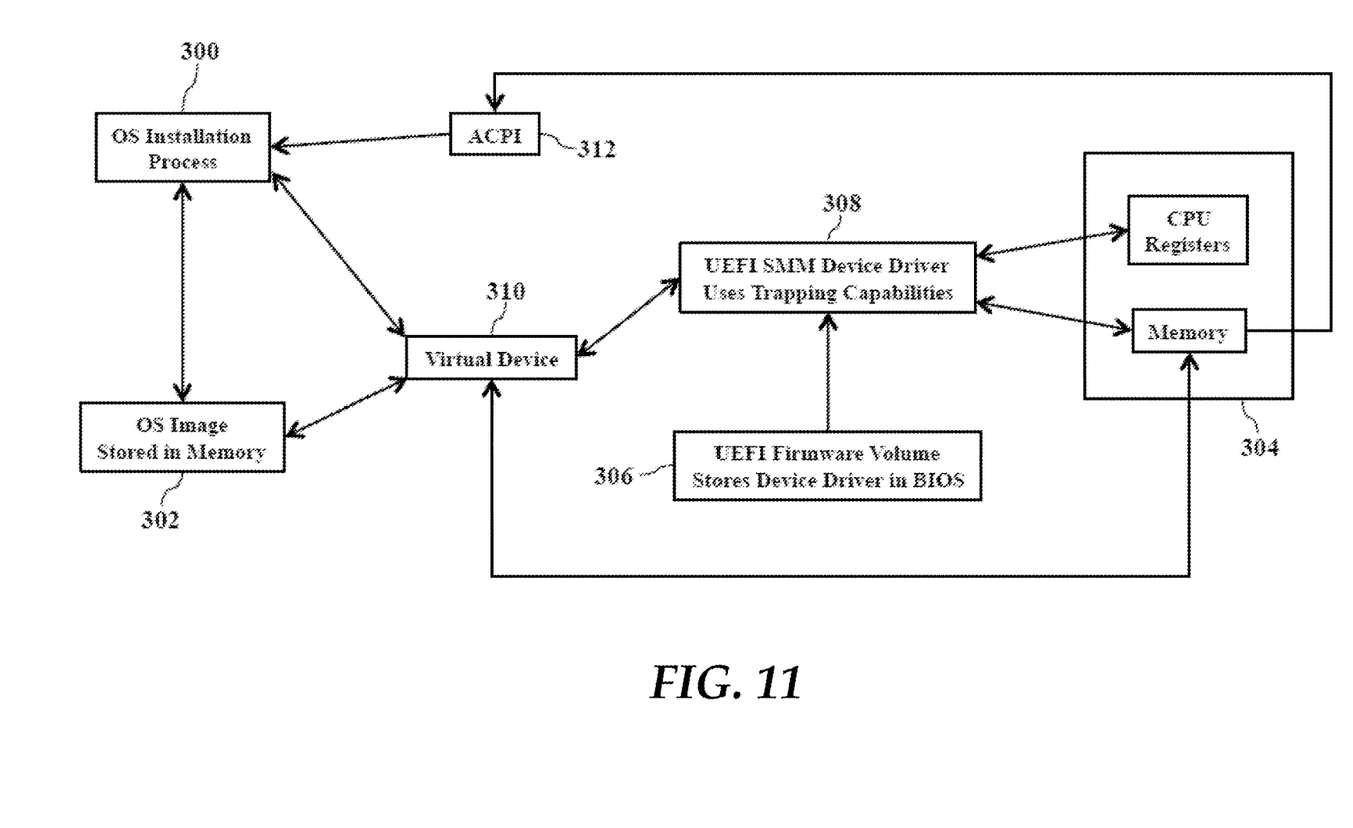
FIG. 11 illustrates installation of an operating system, according to exemplary embodiments.

FIG. 11 illustrates installation of the operating system 206, according to exemplary embodiments. An operating system installation process (Block 300) may consult a memory image stored in the memory 120 (Block 302). As exemplary embodiments may utilize purely local system resources (Block 304), the UEFI firmware volume in the BIOS module 140 stores the device driver (Block 306). The BIOS/EFI module 140 may thus use the local processor's I/O trapping capabilities to emulate a programmed input/output (or "PIO") command and return data (Block 308). The virtual device 202 is an input/output device that provides data using an emulation of the FAT file system (Block 310). This emulation allows the operating system 206 to transfer the device driver 200 from the BIOS module 140 to the image of the operating system 206 stored in the memory 120. The virtual device 202 uses the Advanced Configuration and Power Interface (or "ACPI") specification 260 to specify the I/O resources that the BIOS/EFI module 140 has trapped (Block 312).

Figure 12:
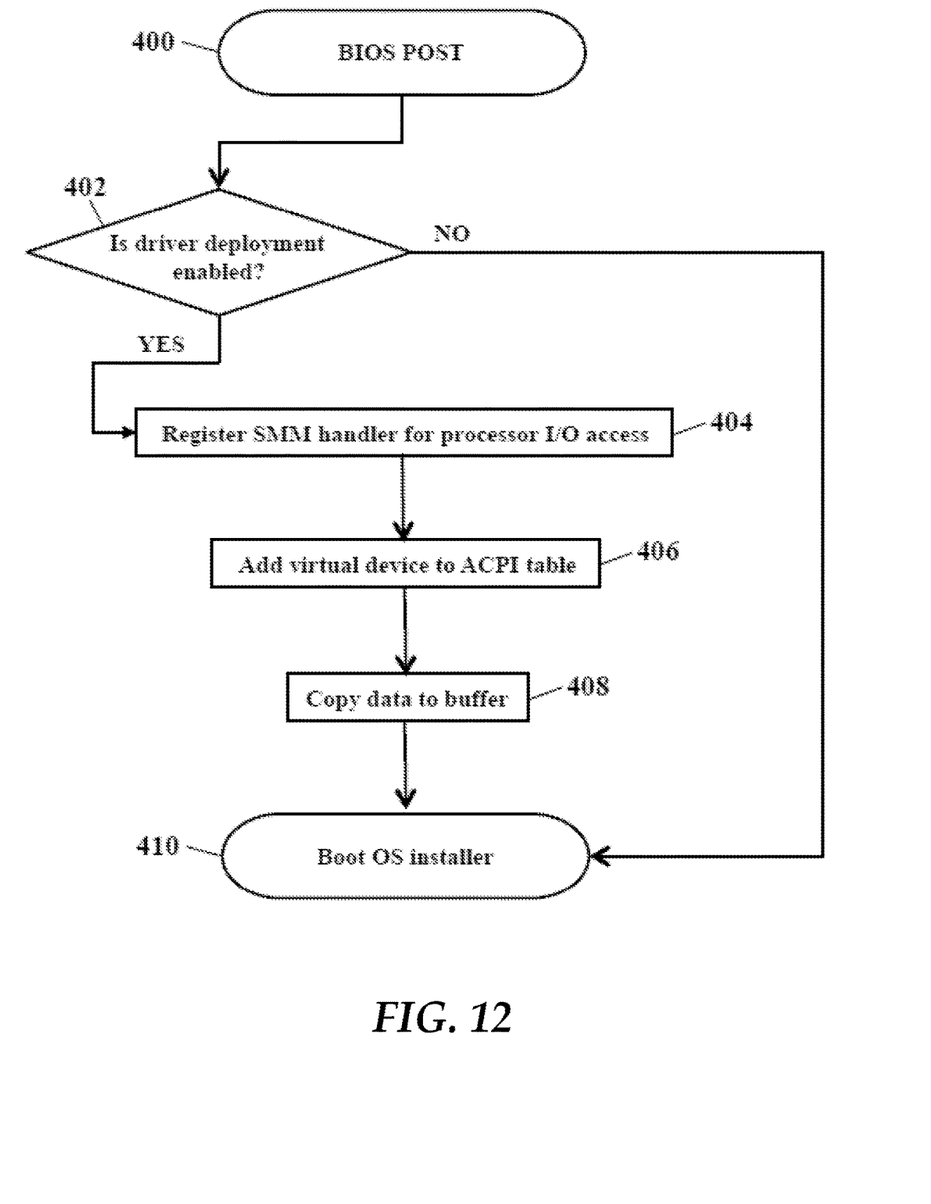
FIG. 12 is a flowchart illustrating a method or algorithm for accessing the device driver, according to exemplary embodiments.

FIG. 12 is a flowchart illustrating a method or algorithm for accessing the device driver 200, according to exemplary embodiments. The BIOS power-on self-test (or "POST") diagnostic routine runs (Block 400). As the reader likely understands, the POST diagnostic routine initially runs and checks the hardware componentry of the information handling system 100. When exemplary embodiments are enabled (Block 402), the SMM handler 248 registers (Block 404). The virtual device 202 is added to a table generated by the Advanced Configuration and Power Interface (or "ACPI") specification 260 (Block 406). The buffer 276 is populated (Block 408) and the operating system installer boots (Block 410).

Figure 13:
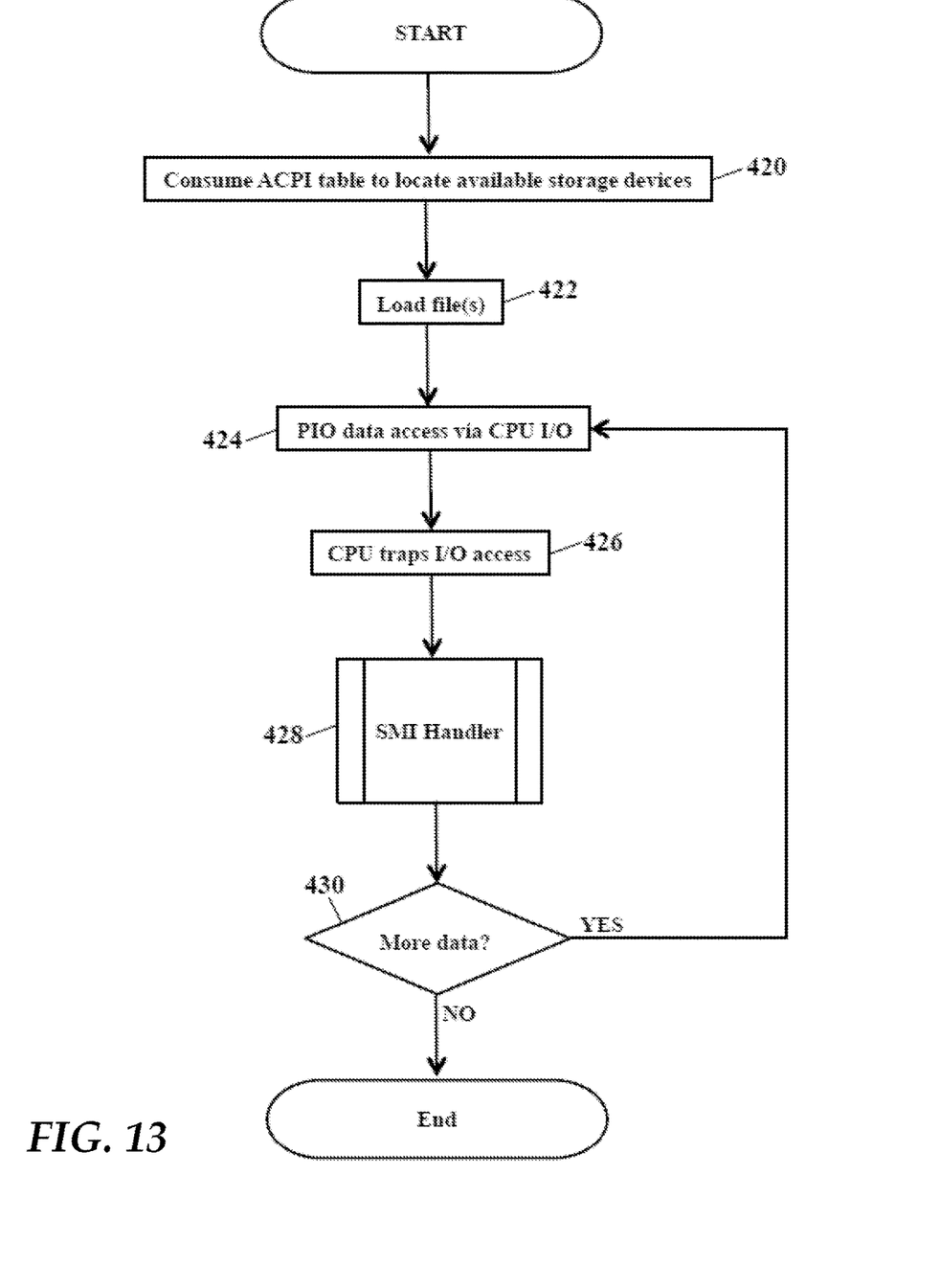
FIG. 13 is a flowchart illustrating a method or algorithm for accessing the virtual device according to exemplary embodiments.

FIG. 13 is a flowchart illustrating a method or algorithm for accessing the virtual device 202, according to exemplary embodiments. A table defining the Advanced Configuration and Power Interface (or "ACPI") is consumed to locate any available storage devices (Block 420). Any files are loaded (Block 422) and the local processor's I/O capabilities are used to access the programmed input/output (or "PIO") data (Block 424). The local processor's I/O trapping capabilities are used to trap data (Block 426). The BIOS SMI handler 248 is called (Block 428). If more data is needed (Block 430), the method returns to Block 424.

Figure 14:
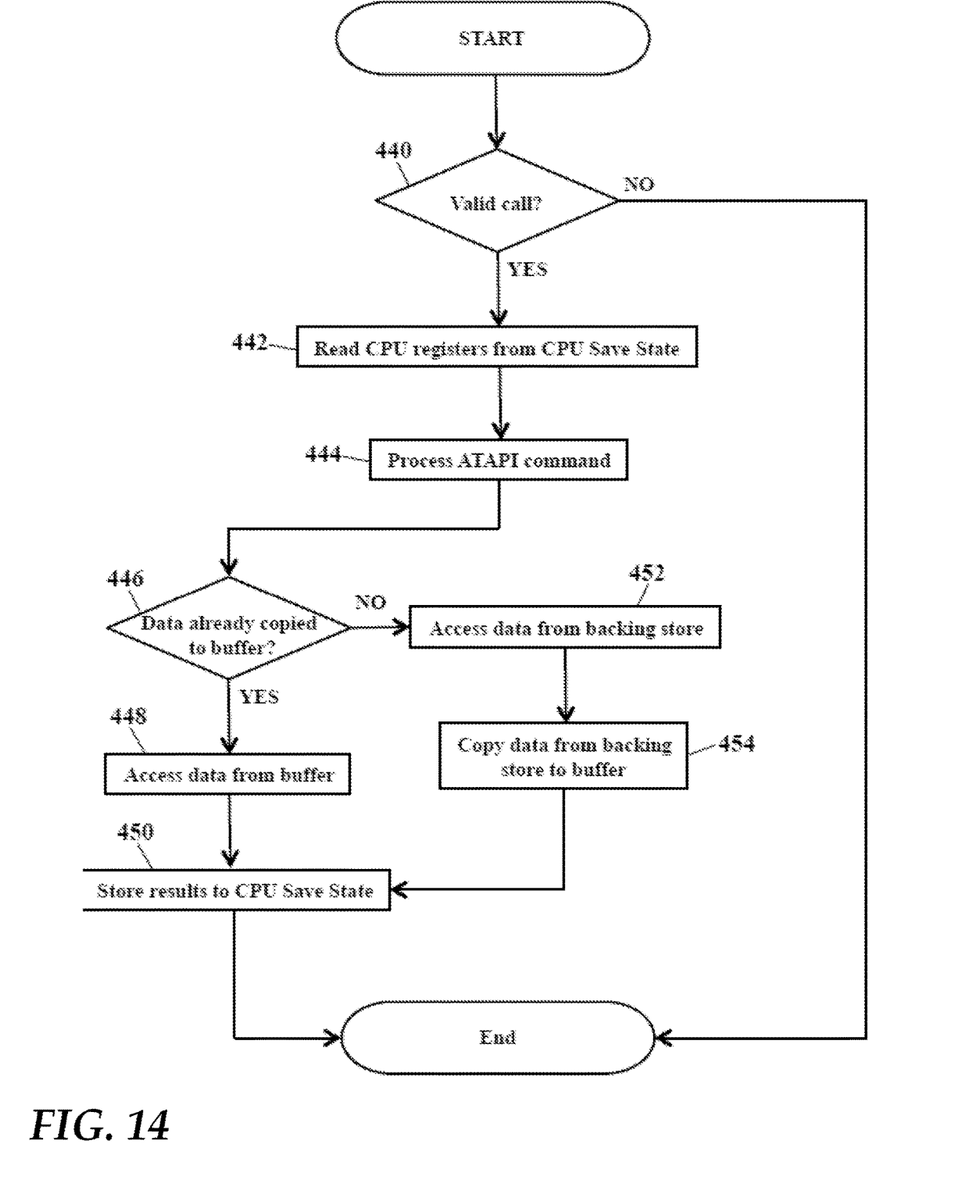
FIG. 14 is a flowchart illustrating a method or algorithm for a virtual device handler according to exemplary embodiments The use of the same reference symbols in different drawings indicates similar or identical items.

FIG. 14 is a flowchart illustrating a method or algorithm for a virtual device handler, according to exemplary embodiments. If a call is valid (Block 440), the local processor reads registers from the SMM Save State Region 250 (Block 442). Any ATA Packet Interface (or "ATAPI") protocol commands are processed (Block 444). If data is already copied to the buffer memory 276 (Block 446), then the data is accessed from the buffer 276 (Block 448) and results are stored to the SMM Save State Region 250 (Block 450). However, if data is not already copied to the buffer memory 276 (Block 446), then data is accessed from a backing store (Block 452) (such as read only memory, network storage, and/or an EFI system partition). The data obtained from the backing store may be copied to the buffer memory 276 (Block 454) and stored to the SMM Save State Region 250 (Block 450).

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality.

The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method, comprising:
pausing, by a processor, an installation of an operating system for a retrieval of a device driver;
executing, by the processor, an input/output trap to transfer virtual data from a virtual device;
recognizing, by the processor, the virtual device based on the virtual data describing an electrical power consumption;
storing, by the processor, the device driver in a basic input output system of a local memory accessible to the processor;
associating, by the processor, the device driver to the virtual device;
retrieving, by the processor, the device driver from the basic input output system of the local memory; and
resuming, by the processor, the installation of the operating system using the device driver retrieved from the basic input output system.

2. The method of claim 1, further comprising associating the device driver to the data trapped during the input/output trap.

3. The method of claim 1, further comprising associating the data trapped during the input/output trap in a file allocation table.

4. The method of claim 1, further comprising associating the data trapped during the input/output trap to a firmware volume associated with the basic input output system.

5. The method of claim 1, further comprising emulating a programmed input/output command.

6. The method of claim 1, further comprising enabling the virtual device.

7. The method of claim 1, further comprising disenabling the virtual device.

8. An information handling system, comprising:
a processor; and
a memory accessible to the processor, the memory storing instructions that when executed cause the processor to perform operations, the operations comprising:
pausing an installation of an operating system for a retrieval of a device driver a virtual device;
executing an input/output trap to transfer virtual data from the virtual device;
recognizing the virtual device based on the virtual data describing an electrical power consumption;
receiving a graphical selection of the virtual device to virtually store the device driver;
remotely storing the device driver via a communications network to a network location accessible to the processor;
associating the device driver to the virtual device;
retrieving the device driver from the network location; and
resuming the installation of the operating system using the device driver retrieved from the network location.

9. The system of claim 8, wherein the operations further comprise associating the device driver to the virtual data trapped during the input/output trap.

10. The system of claim 8, wherein the operations further comprise associating the virtual data trapped during the input/output trap in a file allocation table to the network location.

11. The system of claim 8, wherein the operations further comprise associating the virtual data trapped during the input/output trap to a system server at the network location.

12. The system of claim 8, wherein the operations further comprise emulating a programmed input/output command.

13. The system of claim 8, wherein the operations further comprise enabling the virtual device.

14. The system of claim 8, wherein the operations further comprise disenabling the virtual device.

15. A memory device storing instructions that when executed cause a processor to perform operations, the operations comprising:
- pausing an installation of an operating system for a retrieval of a device driver;
- executing an input/output trap to transfer virtual data from a virtual device;
- recognizing the virtual device based on the virtual data describing an electrical power consumed by the virtual device;
- prompting for a location to store the device driver;
- receiving a graphical selection of the virtual device to virtually store the device driver;
- remotely storing the device driver via a communications network to a network location accessible to the processor;
- associating the device driver to the virtual device;
- retrieving the device driver from the network location; and
- resuming the installation of the operating system using the device driver retrieved from the basic input output system.

16. The memory device of claim 15, wherein the operations further comprise associating the device driver to the virtual data trapped during the input/output trap.

17. The memory device of claim 15, wherein the operations further comprise associating the data trapped during the input/output trap in a file allocation table.

18. The memory device of claim 15, wherein the operations further comprise associating the data trapped during the input/output trap to a firmware volume associated with the basic input output system.

19. The memory device of claim 15, wherein the operations further comprise emulating a programmed input/output command.

20. The memory device of claim 15, wherein the operations further comprise disenabling the virtual device.

* * * * *

UNITED STATES PATENT AND TRADEMARK OFFICE
CERTIFICATE OF CORRECTION

PATENT NO.         : 10,360,043 B2
APPLICATION NO.    : 14/803817
DATED              : July 23, 2019
INVENTOR(S)        : Allen C. Wynn et al.

Page 1 of 1

It is certified that error appears in the above-identified patent and that said Letters Patent is hereby corrected as shown below:

In the Claims

Column 10, Line 63: Please change "a system server" to --a server--

Signed and Sealed this
Tenth Day of March, 2020

Andrei Iancu
*Director of the United States Patent and Trademark Office*